May 19, 1953  C. MESCHIA  2,639,013
MULTIPLE DISK FRICTION CLUTCH
Filed July 30, 1947  3 Sheets-Sheet 1

INVENTOR
CARLO MESCHIA
BY
Michael S. Striker
AGENT

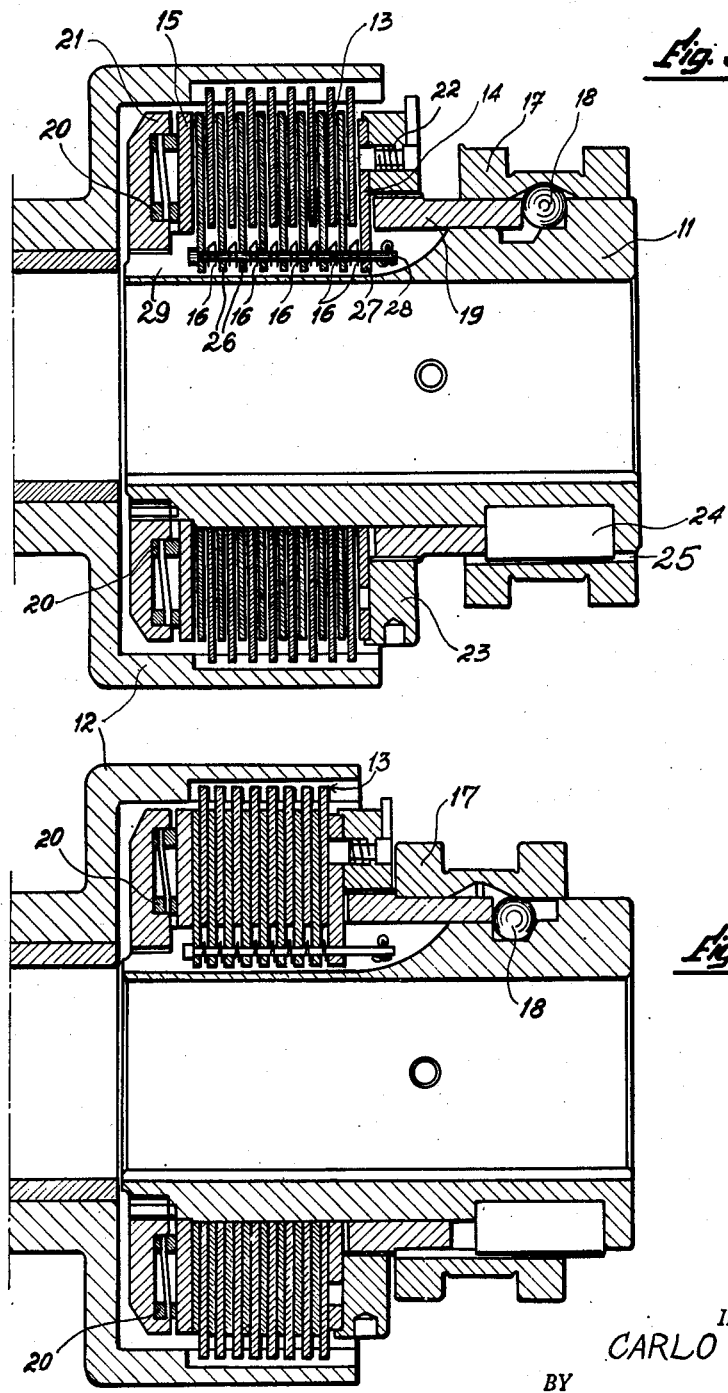

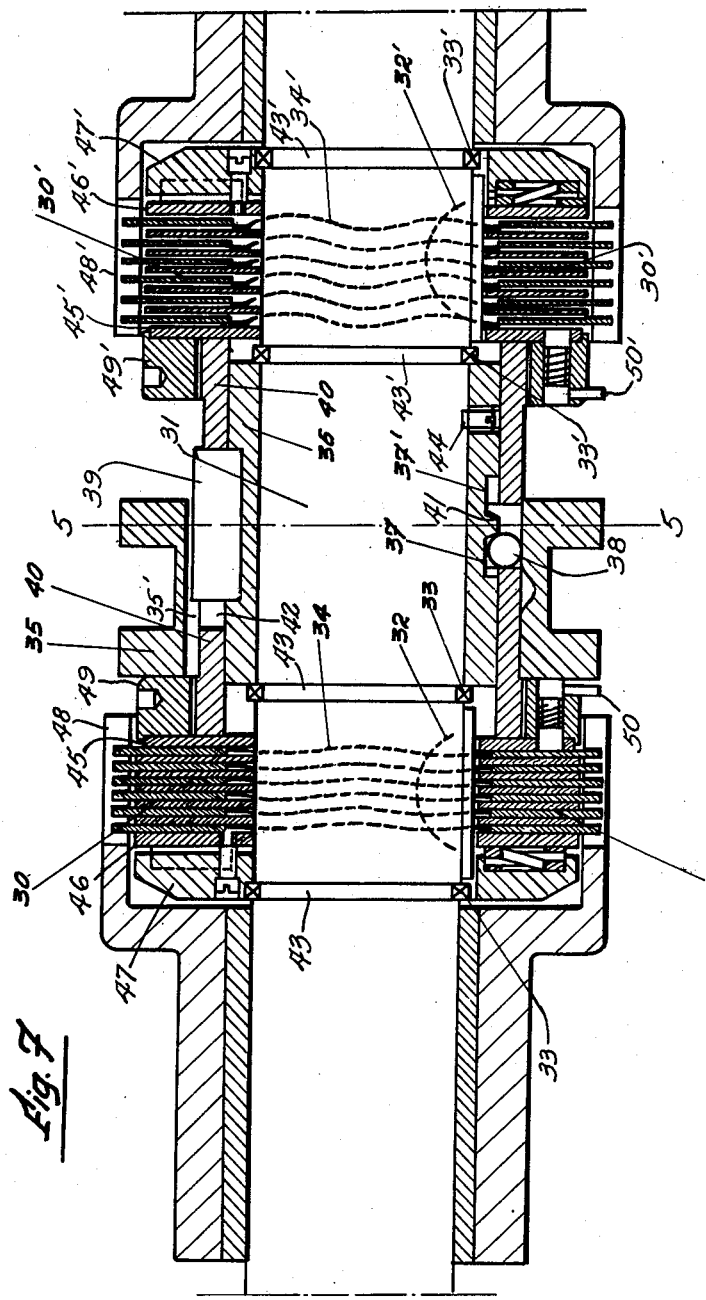

Patented May 19, 1953

2,639,013

UNITED STATES PATENT OFFICE 2,639,013

MULTIPLE DISK FRICTION CLUTCH

Carlo Meschia, Milan, Italy

Application July 30, 1947, Serial No. 764,630
In France October 22, 1946

5 Claims. (Cl. 192—48)

This invention relates to friction couplings, and particularly to disc type couplings in which friction discs are releasably adjustable into frictional engagement in a special manner.

The main object of my invention is to provide an effective friction coupling for interconnecting rotating parts wherein the working members are automatically blocked in engaged position which is attained at the end of a coupling step, and having the friction surfaces thereof subjected to a constant resilient pressure which may be regulated as desired.

Another object is to include in such a coupling a stack of friction discs which are alternately connected in angular direction with a driving member and a driven member and spaced appreciably apart in released position, without causing vibration and chattering or accidental reciprocal contacts between adjacent discs to occur.

A further object is to have a coupling of the character indicated with all surfaces thereof actively used and of such simple and accessible form that they are readily turned and ground to final shape at low cost.

It is also an object to embody the invention in a separate unit provided with rotatable means capable of being connected by various types of fastening means with a driven shaft as well as with the drive shaft of the mechanism in which the present coupling is intended to be inserted.

It is even an object herein to mount a device embodying the invention directly on the shaft of a prime mover by means of rings or wedges respectively located in circular or longitudinal grooves which are readily cut.

The invention is mainly characterized by certain structural and operative features, namely, that between a muff or clutch collar which is axially shiftable by means of a shifting fork or the like of conventional construction, and the friction plates or discs, several rotating members forming a series of intermediate transmitting devices are interposed. The latter may include a rolling bearing race with a set of rolling bearings spaced apart under the muff or the like, and both shiftable in axial direction by means of a circular tapered or conical portion engaging the same and capable of axially moving the friction plates or discs by means of an operating collar or sliding ferrule also preferably provided with an auxiliary collar or ferrule cooperating therewith. The mentioned tapering or conical portions forms part of the side surface of an internal groove in the muff, while the auxiliary collar is provided with a braking device or stop in order to determine and control the maximum open spacing between the friction discs and thus the maximum end pressure attained, the rotating motion transmitting devices during axial shifting reacting against suitable circular surface portions formed on an inner element of the operating collar or ferrule.

A feature of the invention is also to include a series of light springs disposed between alternate friction discs and serving to effect complete disengagement and automatic separation of the discs when the coupling is to be engaged.

The invention furthermore includes one or more end springs forming a resilient system capable of exerting sufficient pressure on the friction disc assembly to transmit the desired torsional movement thereto, and preferably inserted between the end disc of the assembly and a stationary member. The resilient system referred to involves a suitable terminal structure disposed between the operating collar and the first disc of the assembly, while regulation of this resilient system may be obtained by shifting the stationary member by screwing it on the driven or drive shaft in either direction. In addition, the resilient system may be regulated and maintained in attained adjustment by means of a pawl and ratchet system or the like capable of locking the parts in the desired position.

The nature of the profile of the inner groove of the muff or clutch collar and of the interior operating surface portions with which the mentioned rotating members engage automatically provides three stages of operation for an engagement cycle of the coupling; namely, mutual approach of the friction discs through a rapid movement of wide range into substantial proximity; pressure slowly applied upon the friction discs with sufficient force to compress the mentioned resilient system; and finally a swift movement through a variable range automatically locking the device in engaged position.

In order to facilitate ready comprehension of this invention for a proper appreciation of the salient features thereof, the invention is illustrated in several suggesting and non-limiting forms, as well as in a schematic form displaying several different phases of operative engagement as shown on the accompanying drawings forming part hereof, and in which:

Fig. 5 is a longitudinal axial section of a friction coupling made according to the invention and embodying the same in a complete single form and being disposed in disengaged position;

Fig. 6 is a similar longitudinal axial section of the same coupling in engaged position; and Fig. 7 is a longitudinal axial section of a complete coupling in double form with two opposed engaging systems adapted for alternative control of rotation in opposite directions in reversible apparatus and adapted to be mounted on a transmission or drive shaft.

Throughout the views, the same reference numerals indicate the same or like parts.

Figure 1:
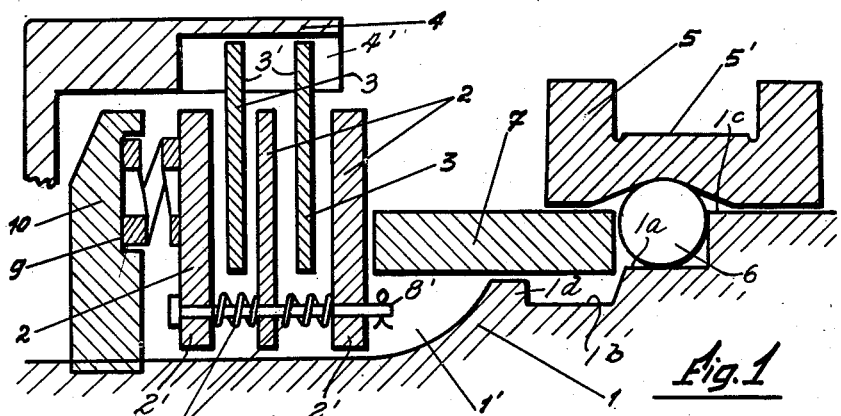
Fig. 1 is a fragmentary axial section of a coupling device made according to the invention and embodying the same in a simple form, the device being shown in disengaged position.

Referring now particularly to Figures 1 to 4 inclusive, a driving or driven shaft 1 has a longitudinal groove or slot 1' into which inward projections 2' of a plurality of friction discs 2 extend in such fashion that the latter are positively rotated with shaft 1. These discs are spaced apart, with a plurality of additional friction discs 3 alternating therewith and also mounted on shaft 1, and having radial projections 3' extending into an internal longitudinal slot 4' in a hollow rotatable head or shaft casing 4 forming part of, or attached to, the respectively opposite drive or driven shaft. Upon shaft 1 is also slidably mounted an operating muff or clutch collar 5 provided with an externally accessible groove 5' in which a more or less conventional shifting fork (not shown) may engage for shifting the muff axially along the shaft for a purpose to be explained.

Due to the projection of radial portions 2' of plates 2 into groove 1' of the shaft 1, all of these plates or discs are held simultaneously angularly together, and the same is true independently of the other alternate discs 3 by virtue of their radial projections 3' extending into slot 4' of hollow shaft casing 4. Within the muff a circular series of rolling bearings 6 are supported on the shaft, normally riding on the intermediate cylindrical step or shoulder 1a on the shaft adjacent to an upper step of annular shoulder 1c thereon within a wide internal groove 5a in the muff having inclined sides 5b.

Surrounding shaft 1 and capable of axial movement within, but independently of, the movable muff 5 is an operating collar or ferrule 7 slidably mounted on annular shoulder 1d of the shaft which may represent the general diameter of the shaft if desired, but between this annular shoulder 1d and cylindrical shoulder 1c is located an annular groove 1b. The mentioned collar or ferrule 7, due to the simplicity of the form of the invention in Figures 1 to 4, directly abuts the end disc 2 at one end of the series and retains bearing members 6 on the cylindrical portion of shoulder 1a, while between each pair of discs 2 is mounted a light separating spring 8. The several separating springs are mounted on a rod 8' extending slidably through portions 2' of discs 2. Between the opposite end disc 2 and a disc or stop plate 10 anchored to shaft 1, are located compression springs 9 (one shown) in order to introduce a factor of resiliency into the system as a whole. In the device thus far described, the friction discs 2 and 3 are free and disengaged so that shaft head 4 is rotatable with its shaft (not shown) and is independent of shaft 1 and its appurtenances.

Figure 2:
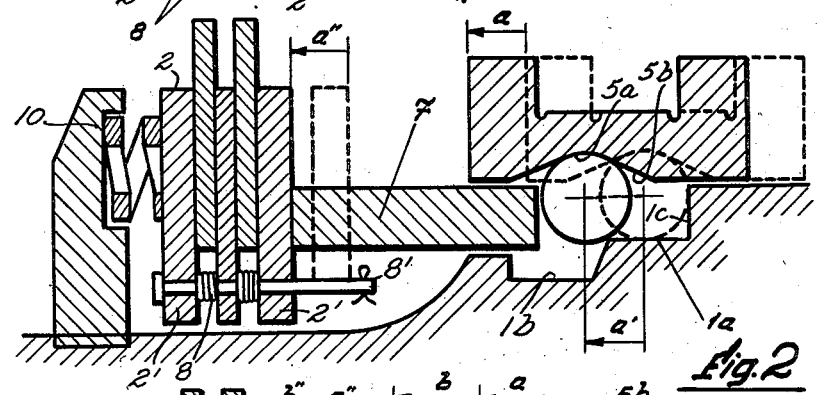
Fig. 2 is a similar view showing the parts as disposed at the end of a first stage of engagement during initial approach of the friction discs.

If the operation of effecting coupling between shaft 1 and shaft casing head 4 is considered, Figure 2 illustrates how axial movement of muff 5 from original position indicated in broken lines in said figure through a distance $a$ toward the discs, thereby serves to guide and thus push bearings 6 off cylindrical shoulder 1a through a distance $a'$ and thus exerts endwise pressure on the right end of operating collar 7, causing the latter to initially bring friction discs 2 and 3 together through distance $a''$ against the pressure of separating springs 8. The indicated distances $a$, $a'$ and $a''$ are substantially equal, and but a small amount of energy is required to effect the movement described, as it is merely that required to compress light separating springs 8.

Figure 3:
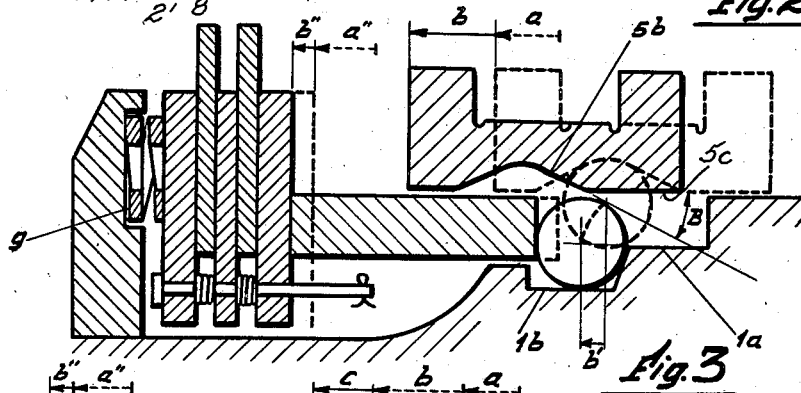
Fig. 3 is also a fragmentary axial section showing the parts in another stage of engagement with the friction discs under compression and the parts being initially locked in engaged position.

The next or pressure phase of the operation illustrated in Figure 3 shows how further axial shifting of muff 5 causes bearing members 6 to shift axially to a distance $b'$ and to drop into groove 1b in which they become located between the end of cylindrical shoulder or step 1a and operating collar 7. This still further compresses the friction discs and also end springs 9. The speed of descent of rolling bearings 6 into the groove 1b with respect to the translational movement of the muff is a function of angle B of one side of groove 5b and the shaft axis. The bottom face 5c of the muff is substantially cylindrical and in this stage sufficiently far advanced over rolling bearings 6 to prevent displacement thereof from groove 1b, the muff having moved from the broken line position of Figures 1 and 2 through the distance $b$ in Figures 3 and 4.

Figure 4:
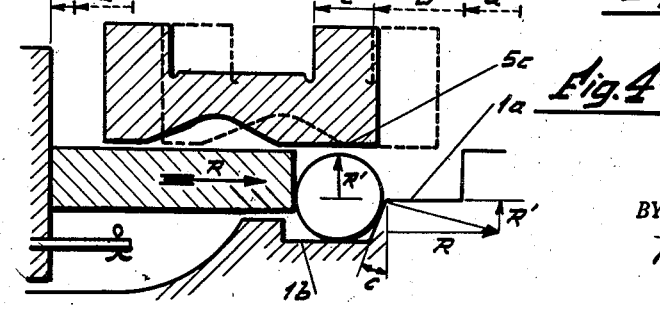
Fig. 4 is a further fragmentary section limited to the actuating parts appearing in the right halves of Figures 1, 2, and 3, showing the parts in the third stage and finally locked in engaged position.

The movement of end disc 2 from released position at the right into the pressure phase is represented by distance $a''$ in Figures 2, 3 and 4, and the final movement of the final compression stages as indicated in Figures 3 and 4 is represented by the relatively short distance $b''$, demonstrating that a small amount of effort suffices to shift rolling bearings 6, the corresponding distance $b'$ through an easily adjusted range of movement, while the final stage of movement of the muff occurs through distance $c$ without having any further effect on the discs, the rolling bearing 6, or an operating collar 7, but simply presents the longer inner cylindrical surface 5c thereof to the rolling bearings, thus effectively and finally covering and thereby blocking them against axial or radial displacement while the discs are mutually engaged under maximum compression.

As indicated in Figure 4, the reaction R of the resilient pressure and spacing members included in the apparatus, due to the angle of inclination C of the junction step between the cylindrical shoulder 1a and the bottom of groove 1b, a radial component R' is produced which is relatively less than the value of R. The result is that no axial component is produced which would tend to displace the muff in axial direction, and hence, the rolling bearings are guided in uniform manner by the groove 1b and inner cylindrical surface 5c of the muff, the coupling thus remaining automatically engaged until the muff is deliberately shifted to idle position by external means such as the fork or other controlling device (not shown).

In order to release the coupling, a reversal of the previously described movement of the muff is effected toward the right through distances $c$, $b$, and $a$. During movement through distance $c$, no change in the other parts will occur, but when the muff or clutch collar 5 passes through distance $b$, the internal groove 5b thereof begins to be presented to the rolling bearings 6, allowing the latter to ride outwardly over the inclined wall between groove or recess 1b and cylindrical shoulder 1a by the effect of the radial component angle $c$ under impulse R of the end springs 9. During return of muff 5 through distance $a$, the roller bearings are wholly returned by resilient axial movement of operating collar 7 to roll on cylindrical surface 1a while being retained thereon by the internal cylindrical surface 5b of the muff. The net result is that the discs are separated by springs 8 and the coupling as a whole is disengaged.

In Figures 5 and 6, a practical form of construction of the coupling is illustrated, wherein the driving or driven shaft 11 serves to carry and support the friction disc mechanism which is effective to connect the shaft 11 with the hollow head or casing 12 of the other shaft to be coupled to this shaft 11. In this embodiment, the disc assembly 13 is compressed between terminal discs 14 and 15 and in released position are spaced apart by light spacing springs 16, while the shiftable muff 17 of the rolling bearings 18 and the operating collar 19 operate in similar fashion to the corresponding members in Figures 1 and 4. Similar remarks apply to compression springs 20 disposed between disc 15 and anchored disc or stop 21 on shaft 11.

Adjacent to end disc 14 is mounted an auxiliary collar 23 preferably screwed upon a threaded portion of operating collar 19 in such fashion as to form virtually an adjustable pushing flange thereon which by rotation can be axially shifted in order to adjust the end pressure intended to be effectively applied to the disc assembly during engagement, the auxiliary collar 23 being provided with a detent pin 22 to prevent relative rotation between collar 23 and end disc 14.

Alternate discs of assembly 13 and end disc 14 have radial projections 26, 27 interconnected by a slidable rod 28 and extending into longitudinal groove 29 in shaft 11, which thus prevents rotation on the shaft of these discs and likewise of collar 23 connected to end disc 14 by a pin 22. As it is desirable also to prevent relative rotation of muff 17, a key 24 is fixed on shaft 11 in longitudinal position to engage slidably in an internal keyway 25 in this muff, so that the latter is free to shift axially along the shaft but is non-rotatable thereon.

In Fig. 6, the muff is shifted to the operative or engaged position of the coupling so as to block the rolling bearings 18 in their lower or inner positions within the cylindrical right end of disc muff, with the auxiliary collar on operating collar 19 bearing against end disc 14 and thereby exerting pressure on the entire disc assembly 13 with the end springs 20 in at least partly compressed condition. Releasing of this coupling will of course occur by operatively shifting muff 17 to the right toward the original position of Figure 5.

While in the foregoing I have shown and described a single friction coupling for either coupling or uncoupling two shafts, it is possible to have a double friction coupling structure embodying the same principles as illustrated in Figure 7. If Figure 5 is momentarily referred to again, it will readily be seen that the entire portion or side of Figure 7 extending to the left of reference 5—5 in the latter figure substantially corresponds thereto with respect to shaft 11, head or casing 12, the disc assembly and the operating and auxiliary collars, the key as well as the muff and rolling bearings. Then, instead of the shaft terminating at the right of line 7—7 at full diameter as in Figure 5, the shaft is provided not only with the left groove 37 but also with a symmetrically opposite groove 37' at the right of the intermediate symmetrical rib or annular shoulder 41 which is provided with sloping sides, with the result that the total structure to the right of reference line 5—5 in Figure 7 is an exact symmetrical duplication of the structure at the left of this line.

In the double form of friction coupling as per Figure 7, an internal drive shaft 31 has a pair of rings 33 spaced apart in grooves 43 at one side, and a similar pair of rings 33' spaced apart in further grooves 43' at the other side of line 5—5 on shaft 31. The two adjacent rings 33 and 33' symmetrically disposed on either side of the mentioned center line on the shaft form stops for a sleeve 36 held against axial displacement thereby, and prevented by means of a set screw 44 from rotating with respect to inner shaft 31. Between the alternate friction discs of groups 30 and 30' are located resilient spacing rings 34 and 34', while splines 32, 32' engaging in the shaft serve to prevent rotation of end discs 45, 45', 46 and 46', as well as anchoring discs or stops 47, 47' within heads or casings 48, 48'.

The mentioned stop discs 47, 47' are prevented from shifting axially apart by the outer mutually remote rings 33 and 33' on shaft 31, while the key 39 fixed in sleeve 36 extends radially out through elongated slot 42 in operating collar or ferrule 40 and slidably into internal keyway 35' in muff 35. Upon the opposite ends of operating collar 40 are adjustably screwed auxiliary collars 49, 49' bearing against inner end discs 45, 45' and being adjustable in pressure relation to the latter by means of adjusting devices 50, 50' similar to the corresponding devices 22 of Figures 5 and 6.

However, in the friction coupling of Figure 7, the arrangement is such that the operating collar, being of substantially double length and construction in contrast with the corresponding operating collar or ferrule of Figures 5 and 6, makes it possible to accomplish more than to shift it a useful distance toward the left from its central position by means of muff 35 to cause coupling through disc assembly 30 between inner shaft 31 and shaft head or casing 48. In such engaged position the rolling bearings 38 are located in annular groove 37 at the left of rib 41, while the disc assembly 30' and shaft 31 with respect to head or casing 48' are uncoupled and therefore independently rotatable.

Thus, the muff 35 may also be shifted toward the right past center, when head 48 with its disc assembly 30 becomes disengaged and rolling bearings 38 are brought over the central annular rib 41 into annular groove 37', and disc assembly 31 thereby becomes engaged in such fashion as to couple shaft 31 to shaft head or casing 48. Thus either head 48 or 48' may be alternatively and selectively coupled through disc assemblies 30 and 30' to the inner shaft 31, at will, by means of the same muff 35 and the operating collars 40.

Manifestly, variations may be resorted to and parts and features may be modified or used without others within the scope of the appended claims.

Having now fully described my invention, I claim:

1. A friction coupling comprising in combination, a drive shaft; a driven shaft; cooperating friction discs carried by said two shafts for transmitting motion between the shafts when compressed; end members provided for said friction discs; a first recess formed on the outer surface of said drive shaft, said first recess having two stepped cylindrical bottom portions connected by an inclined surface; a clutch collar slidable on said drive shaft across said recess; a second recess formed on the inner face of said clutch collar, said second recess having oppositely inclined surfaces and being in inoperative position disposed across the shallower of said stepped bottom portions of said first recess; a ring of balls disposed in said first recess; a slide member disposed for contact with one of said end members and said ring of balls; a stop plate fixedly secured to said drive shaft; spring means abutting at one end against said stop plate and at the other end against the other of said end members and urging said friction discs in one direction toward said slide member; and means for moving said clutch collar axially on said drive shaft whereby said balls are forced by one of said inclined surfaces of said second recess across said inclined surface of said first recess from the shallower onto the deeper of said bottom portions of said first recess when moved in the direction opposite to said one direction, and whereby said balls are forced by the action of said spring means to ride upwardly across said inclined surface from the deeper to the shallower of said bottom portions when said clutch collar is moved in said one direction into inoperative position.

2. A friction coupling comprising in combination, a drive shaft; a driven shaft; cooperating friction discs carried by said two shafts for transmitting motion between the shafts when compressed; end members provided for said friction discs; a first recess formed on the outer surface of said drive shaft, said first recess having two stepped cylindrical bottom portions connected by an inclined surface; a clutch collar slidable on said drive shaft across said recess; a second recess formed on the inner face of said clutch collar, said second recess having oppositely inclined surfaces and being in inoperative position disposed across the shallower of said stepped bottom portions of said first recess; a ring of balls disposed in said first recess; a ferrule slidably disposed on said drive shaft so as to be in contact with one of said end members at one end and with said ring of balls at the other end; a stop plate fixedly secured to said drive shaft; spring means abutting at one end against said stop plate and at the other end against the other of said end members and urging said friction discs in one direction toward said slide member; and means for moving said clutch collar axially on said drive shaft whereby said balls are forced by one of said inclined surfaces of said second recess across said inclined surface of said first recess from the shallower onto the deeper of said bottom portions of said first recess when moved in the direction opposite to said one direction, and whereby said balls are forced by the action of said spring means to ride upwardly across said inclined surface from the deeper to the shallower of said bottom portions when said clutch collar is moved in said one direction into inoperative position.

3. A friction coupling comprising in combination, a drive shaft; a driven shaft; cooperating friction discs carried by said two shafts for transmitting motion between the shafts when compressed; end members provided for said friction discs; a first recess formed on the outer surface of said drive shaft, said first recess having two stepped cylindrical bottom portions connected by an inclined surface; a clutch collar slidable on said drive shaft across said recess; a second recess formed on the inner face of said clutch collar, said second recess having oppositely inclined surfaces and being in inoperative position disposed across the shallower of said stepped bottom portions of said bottom portions of said first recess; a ring of balls disposed in said first recess; a slide member disposed for contact with one of said end members and said ring of balls; a stop plate fixedly secured to said drive shaft; spring means abutting at one end against said stop plate and at the other end against the other of said end members and urging said friction discs in one direction toward said slide member; resilient means for urging said friction discs and said end members apart; and means for moving said clutch collar axially on said drive shaft whereby said balls are forced by one of said inclined surfaces of said second recess across said inclined surface of said first recess from the shallower onto the deeper of said bottom portions of said first recess when moved in the direction opposite to said one direction, and whereby said balls are forced by the action of said spring means to ride upwardly across said inclined surface from the deeper to the shallower of said bottom portions when said clutch collar is moved in said one direction into inoperative position.

4. A friction coupling comprising in combination, a drive shaft; a driven shaft; cooperating friction discs carried by said two shafts for transmitting motion between the shafts when compressed; end members provided for said friction discs; a first recess formed on the outer surface of said drive shaft, said first recess having two cylindrical bottom portions connected by an inclined surface; a clutch collar slidable on said drive shaft across said recess; a second recess formed on the inner face of said clutch collar, said second recess having oppositely inclined surfaces and being in inoperative position disposed across one of said bottom portions of said first recess; a ring of balls disposed in said first recess; a slide member disposed for contact with one of said end members and said ring of balls; a stop plate fixedly secured to said drive shaft; spring means abutting at one end against said stop plate and at the other end against the other of said end members and urging said friction discs in one direction toward said slide member; resilient means disposed between said friction discs urging the said friction discs and said end members apart; and means for moving said clutch collar axially on said drive shaft whereby said balls are forced by one of said inclined surfaces of said second recess across said inclined surface of said first recess from one onto the other of said bottom portions of said first recess and whereby said spring means force said balls to return when said clutch collar is returned to inoperative position.

5. A friction coupling comprising in combination, a drive shaft; a pair of driven shafts; cooperating friction discs, one group for each of said driven shafts, the said friction discs being carried by said driving shaft and said driven shafts for transmitting motion between said driving shaft and said driven shafts when compressed; end members provided for each group of said friction discs; a first recess formed on the outer surface of said drive shaft, the said first recess having two cylindrical bottom portions connected by a raised portion having the shape of a truncated cone in section; a clutch collar slidable on said drive shaft across said first recess; a second recess formed on the inner face of said clutch collar, said second recess having oppositely inclined surfaces and being normally disposed across part of said first recess; a single ring of balls disposed in said first recess; a pair of slide members, one for each group of said friction discs, each of said slide members being disposed for contact with one of said end members and with said balls; and means for moving said clutch collar axially on said drive shaft whereby said balls are forced by one or the other of said inclined surfaces of said second recess onto one or the other of said bottom portions of said first recess.

MESHIA, CARLO.

References Cited in the file of this patent

UNITED STATES PATENTS

| Number | Name | Date |
|---|---|---|
| 614,951 | Hoffmann | Nov. 29, 1898 |
| 2,185,714 | Scherer | Jan. 2, 1940 |
| 2,217,357 | Coe | Oct. 8, 1940 |
| 2,367,390 | Firth et al. | Jan. 16, 1945 |
| 2,376,799 | Miller | May 22, 1945 |
| 2,397,414 | Fast | Mar. 26, 1946 |